A. Scarlett,
Bottle Stopper.

N° 52,755. Patented Feb. 20, 1866.

Witnesses:
John D. Engelbrecht
J. A. Farrand

Inventor:
Augustus Scarlett

United States Patent Office.

AUGUSTUS SCARLETT, OF NEWARK, NEW JERSEY, ASSIGNOR TO HIMSELF AND SAMUEL A. FARRAND, OF SAME PLACE.

IMPROVED BOTTLE-STOPPER.

Specification forming part of Letters Patent No. 52,755, dated February 20, 1866.

*To all whom it may concern:*

Be it known that I, AUGUSTUS SCARLETT, of Newark, in the county of Essex, in the State of New Jersey, have invented a new and Improved Contrivance for Pouring Liquids from Bottles or other Similar Vessels; and I do hereby declare that the following is a full and exact description thereof, reference being had to the accompanying drawings, and to the letters of reference marked thereon.

Figure 3:
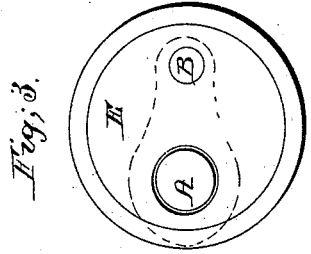
Figure 2:
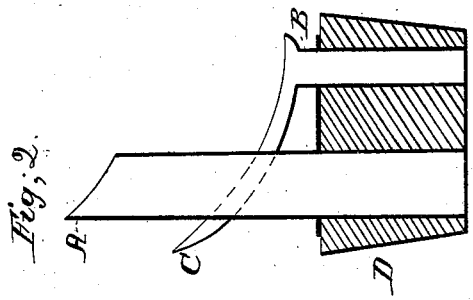
Figure 1:
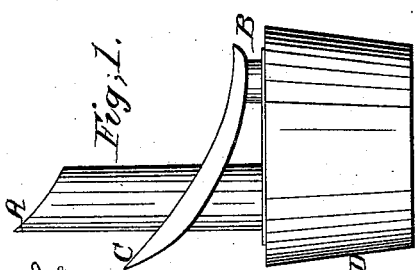

Figure 1 is an elevation; Fig. 2, a vertical section through the tubes; and Fig. 3 a transverse section, the dotted lines showing the position of the oblong pan hereinafter referred to.

The contrivance consists of two tubes passing through the cork or stopper of the vessel near opposite sides, one about twice the diameter and twice the length of the other. They may be made of metal, or such other material as the nature of the liquid may require. These tubes are connected above the stopper by an oblong pan surrounding the larger tube and leading to the smaller one, with which it communicates, as shown in the drawings. The bottom of the pan descends from the larger tube to the smaller one in a cycloidal curve.

The tubes are strengthened and held in place by a plate resting on the cork or stopper.

A is the larger tube; B, the smaller one; C, the oblong pan; D, the cork, and E the plate strengthening the tubes. The tube A is for the passage of the liquid. The tube B supplies air to the vessel as the liquid is discharged. The pan C serves to catch whatever liquid may drip from the discharging-tube. The cycloidal form of the bottom of this pan conveys the drippings to the smaller tube in the most speedy manner, through which their return to the vessel is further facilitated by the atmospheric pressure.

The nature of my invention consists in attaching to the larger tube a pan to catch the liquid that may drip from the spout, and connecting this pan with the smaller tube, which serves to supply air to the vessel, in such a manner as to convey the liquid thus caught back into the vessel, its return being facilitated by the atmospheric pressure.

What I claim as my invention, and desire to secure by Letters Patent, is—

Making use of the tube by which air is supplied to the vessel for the additional purpose of conveying the drippings back into the vessel.

AUGUSTUS SCARLETT.

Witnesses:
WM. HUMES,
S. A. FARRAND.